United States Patent
Yang et al.

(10) Patent No.: US 8,559,613 B2
(45) Date of Patent: Oct. 15, 2013

(54) METHOD AND SYSTEM FOR PERFORMING COMMUNICATION TRANSFER SERVICE FOR ACCESS GATEWAY CONTROL FUNCTION USER

(75) Inventors: Qiang Yang, Shenzhen (CN); Chen Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 114 days.

(21) Appl. No.: 13/258,376

(22) PCT Filed: Jul. 19, 2010

(86) PCT No.: PCT/CN2010/075235
§ 371 (c)(1),
(2), (4) Date: Mar. 12, 2012

(87) PCT Pub. No.: WO2011/035638
PCT Pub. Date: Mar. 31, 2011

(65) Prior Publication Data
US 2012/0201369 A1 Aug. 9, 2012

(30) Foreign Application Priority Data
Sep. 22, 2009 (CN) .......................... 2009 1 0093867

(51) Int. Cl.
*H04M 7/00* (2006.01)
*H04L 12/66* (2006.01)
(52) U.S. Cl.
USPC ................... 379/219; 379/221.01; 370/356
(58) Field of Classification Search
USPC ................. 379/219, 201.01, 221.01, 241, 379/265.01–265.14, 266.01–266.1
See application file for complete search history.

(56) References Cited

U.S. PATENT DOCUMENTS

2007/0008957 A1 1/2007 Huang
2007/0086581 A1 4/2007 Zhu et al.
(Continued)

FOREIGN PATENT DOCUMENTS

| CN | 1747470 A | 3/2006 |
|---|---|---|
| CN | 101217600 A | 7/2008 |
| RU | 2326503 C2 | 6/2008 |

OTHER PUBLICATIONS

International Search Report in international application No. PCT/CN2010/075235, mailed on Oct. 21, 2010.

(Continued)

*Primary Examiner* — William Deane, Jr.
(74) *Attorney, Agent, or Firm* — Oppedahl Patent Law Firm LLC

(57) ABSTRACT

The disclosure provides a method for performing a communication transfer service for an access gateway control function user, comprising: after the AGCF user accesses to a public Switched Telephone Network/Integrated Services Digital Network Emulation Subsystem (PSTN/ISDN Emulation Subsystem (PES)), performing the communication transfer service for the AGCF user, by applying a tight/loose coupling mode between an AGCF and an application server (AS) and by applying an AS main control/end to end control mode between the AS and non-AGCF users. The disclosure also provides a system for performing a communication transfer service for an access gateway control function user, comprising: a communication transfer unit configured to perform the communication transfer service for the user belonging to the AGCF by applying a tight/loose coupling mode between the AGCF and an application server (AS) and by applying an AS main control/end to end control mode between the AS and non-AGCF users. The communication transfer service for a user belonging to the AGCF can be is performed by using the method and the system of the disclosure.

14 Claims, 6 Drawing Sheets

(56) References Cited

U.S. PATENT DOCUMENTS

2007/0177603 A1* 8/2007 Calme et al. ............... 370/395.2
2007/0274462 A1* 11/2007 Wu ................................ 379/37
2008/0049648 A1 2/2008 Liu et al.
2008/0310406 A1* 12/2008 Huang ......................... 370/356
2010/0040218 A1 2/2010 Shen et al.
2010/0246574 A1* 9/2010 Shi et al. ...................... 370/352

OTHER PUBLICATIONS

English Translation of the Written Opinion of the International Search Authority in international application No. PCT/CN2010/075235, mailed on Oct. 21, 2010.
ETSI TS 183 043 V2.3.1 Mar. 31, 2009.

* cited by examiner

METHOD AND SYSTEM FOR PERFORMING COMMUNICATION TRANSFER SERVICE FOR ACCESS GATEWAY CONTROL FUNCTION USER

TECHNICAL FIELD OF THE INVENTION

The disclosure relates to the communication field, and in particular to a method and system for performing a communication transfer service for an access gateway control function (AGCF) user in a Public Switched Telephone Network/Integrated Services Digital Network Emulation Subsystem (PSTN/ISDN Emulation Subsystem (PES)) network.

BACKGROUND OF THE INVENTION

As an Internet Protocol (IP) based network architecture proposed by the 3rd Generation Partnership Project (3GPP), the IP Multimedia Core Network Subsystem (IMS) establishes an open and flexible service environment, supports multimedia applications, and provides rich multimedia services for the users. A PES is an IP based network architecture for accessing traditional terminals to an IMS network is proposed by Telecommunications and Internet Converged Services and Protocols for Advanced Networking (TISPAN).

In the prior art, currently, there have been communication transfer services for session initial protocol (SIP) terminals implemented in the IMS architecture, including blind communication transfer and inquiry communication transfer; some manufacturers utilize this technology to perform blind communication transfer and inquiry communication transfer for traditional H248 terminals in the AGCF, in order to attempt to replace the communication transfer service for the traditional H248 terminals with the above two services. However, the problems with the prior art lie in that: both services of blind communication transfer and inquiry communication transfer have to be registered for a user; a user has to select using blind communication transfer or inquiry communication transfer before a communication transfer is performed, and the selection is unchangeable once being made; user experiences are also different, for example, a service user will not hear a ring-back tone after initiating a communication transfer; and for blind communication transfer and inquiry communication transfer services for existing AGCF users, tight coupling has not been implemented yet.

ETSI 183 043 has been proposed to solve the above problems; however, the existing ETSI 183 043 just describes two implementation modes, i.e., loose coupling and tight coupling, for traditional services for H248 users, such as services of three-party calling and call waiting, and the appendix of ETSI 183 043 also describes related flows. Currently, there is no specification regarding how to perform the communication transfer service for a user belonging to the AGCF, nor any description of related technologies.

SUMMARY OF THE INVENTION

In view of the above, the main objective of the disclosure is to provide a method and system for performing a communication transfer service for an AGCF user.

In order to achieve the above objective, the technical solutions of the disclosure are provided as follows.

A method of performing a communication transfer service for an access gateway control function (AGCF) user, comprises: after the AGCF user accesses to a public Switched Telephone Network/Integrated Services Digital Network Emulation Subsystem (PSTN/ISDN Emulation Subsystem (PES)), performing the communication transfer service for the AGCF user, by applying a tight/loose coupling mode between an AGCF and an application server (AS) and by applying an AS main control/end to end control mode between the AS and non-AGCF users.

Wherein the performing the communication transfer service by applying the tight coupling mode and by applying the AS main control mode may comprise:

after the AGCF user hooks on, the AGCF sends call releasing messages to the AS for the conversations between the AGCF user and the non-AGCF users, and triggers an interaction between the AGCF and the AS in the tight coupling mode; and the AS triggers the AS main control mode by sending media modifying request messages to the non-AGCF users, who perform a media negotiation in the AS main control mode and a conversation between each other.

Wherein the AGCF user may include a user A, the non-AGCF users may include a user B and a user C; in the case of communication transfer in a ringing state, the performing the communication transfer service may further comprises:

the user A hooks on, the AGCF releases a terminal of the user A; the AGCF sends a call releasing message to the AS for the conversations between the user A and the user B as well as between the user A and the user C, respectively; and the AS sends a release response message to the AGCF for the conversations between the user A and the user B as well as between the user A and the user C, respectively;

after the user C hooks off to send an acknowledgement response message to the AS, the AS sends a media modifying request message to the user C; the user C sends a media modifying response message to the AS; the AS sends a media modifying request message to the user B; the user B sends a media modifying response message to the AS; the AS sends a media modifying request message to the user C; the user C sends a media modifying response message to the AS; a conversation between the user B and the user C is performed;

or, the AGCF user may include a user A, the non-AGCF users may include a user B and a user C; in the case of communication transfer in a conversation state, the performing the communication transfer service further comprises:

after the user C hooks off to send an acknowledgement response message to the AS, the user A hooks on, the AGCF releases the terminal of the user A; the AGCF sends a call releasing message to the AS for the conversations between the user A and the user B as well as between the user A and the user C, respectively; and the AS sends a release response message to the AGCF for the conversations between the user A and the user B as well as between the user A and the user C, respectively;

the AS sends a media modifying request message to the user C; the user C sends a media modifying response message to the AS; the AS sends a media modifying request message to the user B; the user B sends a media modifying response message to the AS; the AS sends a media modifying request message to the user C; the user C sends a media modifying response message to the AS; a conversation between the user B and the user C is performed.

Wherein the performing the communication transfer service by applying the tight coupling mode and by applying the end to end control mode may comprise:

after the AGCF user hooks on, the AGCF sends call releasing messages to the AS for the conversations between the AGCF user and the non-AGCF users, and triggers an interaction between the AGCF and the AS in the tight coupling mode; and the AS triggers the end to end control mode by sending call changing request messages to the non-AGCF users, who perform a media negotiation in the end to end control mode and a conversation between each other.

Wherein the AGCF user may include a user A, the non-AGCF users may include a user B and a user C; in the case of communication transfer in a conversation state, the performing the communication transfer service may further comprise:

after the user C hooks off to send an acknowledgement response message to the AS, the user A hooks on, the AGCF releases a terminal of the user A; the AGCF sends a call releasing message to the AS for the conversations between the user A and the user B as well as between the user A and the user C, respectively; and the AS sends a release response message to the AGCF for the conversations between the user A and the user B as well as between the user A and the user C, respectively; and the AS sends a call changing request message to the user B; the user B sends a call changing request reception message to the AS; the user B sends a call changing start message to the AS; the user B sends a session inviting message to the AS; the AS sends a session inviting message to the user C; the user C sends an acknowledgement response message to the AS; the AS sends an acknowledgement response message to the user B; a conversation between the user B and the user C is performed;

or, the AGCF user may include a user A, the non-AGCF users may include a user B and a user C; in the case of communication transfer in a ringing state, the performing the communication transfer service may further comprise:

the user A hooks on, the AGCF releases a terminal of the user A; the AGCF sends a call releasing message to the AS for the conversations between the user A and the user B as well as between the user A and the user C, respectively; and the AS sends a release response message to the AGCF for the conversations between the user A and the user B as well as between the user A and the user C, respectively; and after the user C hooks off to send an acknowledgement response message to the AS, the AS sends a call changing request message to the user B; the user B sends a call changing request reception message to the AS; the user B sends a call changing start message to the AS; the user B sends a session inviting message to the AS; the AS sends a session inviting message to the user C; the user C sends an acknowledgement response message to the AS; the AS sends an acknowledgement response message to the user B; a conversation between the user B and the user C is performed.

Wherein the performing the communication transfer service by applying the loose coupling mode and applying the AS main control mode may comprise:

after the AGCF user hooks on, the AGCF triggers an interaction between the AGCF and the AS in the loose coupling mode, by sending a call changing request message to the AS; and the AS triggers the AS main control mode by sending media modifying request messages to the non-AGCF users, who perform a media negotiation in the AS main control mode and a conversation between each other.

Wherein the AGCF user may include a user A, the non-AGCF users may include a user B and a user C; in the case of communication transfer in a conversation state, the performing the communication transfer service may further comprise:

after the user C hooks off to send an acknowledgement response message is to the AS, the user A hooks on, the AGCF releases a terminal of the user A; the AGCF sends a call changing request message to the AS; the AS sends a call changing start message to the AGCF; the AS sends a call changing success message to the AGCF; the AS sends a call releasing message to the AGCF for the call between the user A and the user C; the AGCF sends a call releasing message to the AS for the call between the user A and the user B; and the AS sends a media modifying request message to the user C; the user C sends a media modifying response message to the AS; the AS sends a media modifying request message to the user B; the user B sends a media modifying response message to the AS; the AS sends a media modifying request message to the user C; the user C sends a media modifying response message to the AS; a conversation between the user B and the user C is performed;

or, the AGCF user may include a user A, the non-AGCF users may include a user B and a user C; in the case of communication transfer in a ringing state, the performing is the communication transfer service may further comprise:

the user A hooks on, the AGCF releases the terminal of the user A; the AGCF sends a call changing request message to the AS; the AS sends a call changing request reception message to the AGCF; the AS sends a call changing start message to the AGCF; the AS sends a call changing success message to the AGCF; the AS sends a call releasing message to the AGCF for the call between the user A and the user C; the AGCF sends a call releasing message to the AS for the call between the user A and the user B;

after the user C hooks off to send an acknowledgement response message to the AS, the AS sends a media modifying request message to the user C; the user C sends a media modifying response message to the AS; the AS sends a media modifying request message to the user B; the user B sends a media modifying response message to the AS; the AS sends a media modifying request message to the user C; the user C sends a media modifying response message to the AS; a conversation between the user B and the user C is performed.

Wherein the performing the communication transfer service by applying the loose coupling mode and applying the end to end mode may comprise:

after the AGCF user hooks on, the AGCF triggers an interaction between the AGCF and the AS in the loose coupling mode, by sending a call changing request message to the AS; and the AS triggers the end to end control mode by sending call changing request messages to the non-AGCF users, who perform a media negotiation in the end to end control mode and a conversation between each other.

Wherein the AGCF user may include a user A, the non-AGCF users may include a user B and a user C; in the case of communication transfer in a conversation state, the performing the communication transfer service may further comprise:

after the user C hooks off to send an acknowledgement response message to the AS, the user A hooks on, the AGCF releases a terminal of the user A; the AGCF sends a call changing request message to the AS; the AS sends a call changing is request reception message to the AGCF; the AS sends a call changing start message to the AGCF; the AS sends a call releasing message to the AGCF for the call between the user A and the user C; the AS sends a call changing success message to the AGCF; the AGCF sends a call releasing message to the AS for the call between the user A and the user B;

The AS sends a call changing request message to the user B; the user B sends a call changing request reception message to the AS; the user B sends a call changing start message to the AS; the user B sends a session inviting message to the AS; the AS sends a session inviting message to the user C; the user C sends an acknowledgement response message to the AS; the AS sends an acknowledgement response message to the user B; a conversation between the user B and the user C is performed;

or, the AGCF user may include a user A, the non-AGCF users may include a user B and a user C; in the case of communication transfer in a ringing state, the performing the communication transfer service may further comprise:

the user A hooks on, the AGCF releases the terminal of the user A; the AGCF sends a call changing request message to the AS; the AS sends a call changing request reception message to the AGCF; the AS sends a call changing start message to the AGCF; the AS sends a call releasing message to the AGCF for the call between the user A and the user C; the AS sends a call changing success message to the AGCF; the AGCF sends a call releasing message to the AS for the call between the user A and the user B;

after the user C hooks off to send an acknowledgement response message to the AS, the AS sends a call changing request message to the user B; the user B sends a call changing request reception message to the AS; the user B sends a call changing start message to the AS; the user B sends a session inviting message to the AS; the AS sends a session inviting message to the user C; the user C sends an acknowledgement response message to the AS; AS sends an acknowledgement response message to the user B; a conversation between the user B and the user C is performed.

A system of performing a communication transfer service for an access gateway control function user comprises: a communication transfer performing unit configured for the AGCF user to access to a PES via the AGCF, wherein the communication transfer service for the AGCF user is performed by applying a tight/loose coupling mode between the AGCF and an application server (AS) and by applying an AS main control/end to end control mode between the AS and non-AGCF users.

Wherein the communication transfer unit, in the case that the tight coupling mode and the AS main control mode are applied, may be further configured to such that after the AGCF user hooks on, the AGCF sends call releasing messages to the AS for the conversations between the AGCF user and the non-AGCF users, and triggers an interaction between the AGCF and the AS in the tight coupling mode; and the AS triggers the AS main control mode, by sending a media modifying request message to the non-AGCF users; the non-AGCF users perform a media negotiation in the AS main control mode and perform a conversation between each other.

Wherein the communication transfer unit, in the case that the tight coupling mode and the end to end control mode are applied, may be further configured to such that after the AGCF user hooks on, the AGCF sends call releasing messages to the AS for the conversations between the AGCF user and the non-AGCF users, and triggers an interaction in the tight coupling mode between the AGCF and the AS; and the AS triggers the end to end control mode by sending call changing request messages to the non-AGCF users; the non-AGCF users perform media negotiations in the end to end control mode and perform a conversation between each other.

Wherein the communication transfer unit, in the case that the loose coupling mode and the AS main control mode are applied, may be further configured to such that after the AGCF user hooks on, the AGCF triggers an interaction in the loose coupling mode between the AGCF and the AS by sending a call changing request message to the AS;

the AS triggers the AS main control mode by sending media modifying request messages to the non-AGCF users; the non-AGCF users perform a media negotiation in the AS main control mode and perform a conversation between each other.

Wherein the communication transfer unit, in the case that the loose coupling mode and the AS main control mode are applied, may be further configured to such that after the AGCF user hooks on, the AGCF triggers an interaction in the loose coupling mode between the AGCF and the AS by sending a call changing request message to the AS; and the AS triggers the end to end control mode by sending call changing request messages to the non-AGCF users; the non-AGCF users perform a media negotiation in the end to end control mode and perform a conversation between each other.

According to the disclosure, after an AGCF user accesses to a PES via the AGCF, the communication transfer service for the AGCF user is performed by applying a tight/loose coupling mode between the AGCF and the application server (AS) and applying the AS main control/end to end control mode between the AS and non-AGCF users.

With the disclosure, the traditional fixed network users can use the communication transfer service including communication transfer in a ringing state and communication transfer in a conversation state normally, after accessing to the PES network via the AGCF. The use habit is also the same as that before accessing to the PES network. For the communication transfer service, two implementation modes between the AGCF and the AS, i.e., loose coupling and tight coupling, and two implementation modes between the AS and the non-AGCF users, i.e., end to end control and AS main control are provided in the disclosure, to perform the communication transfer service for the user belonging to the AGCF.

DETAILED DESCRIPTION OF THE INVENTION

Figure 1:
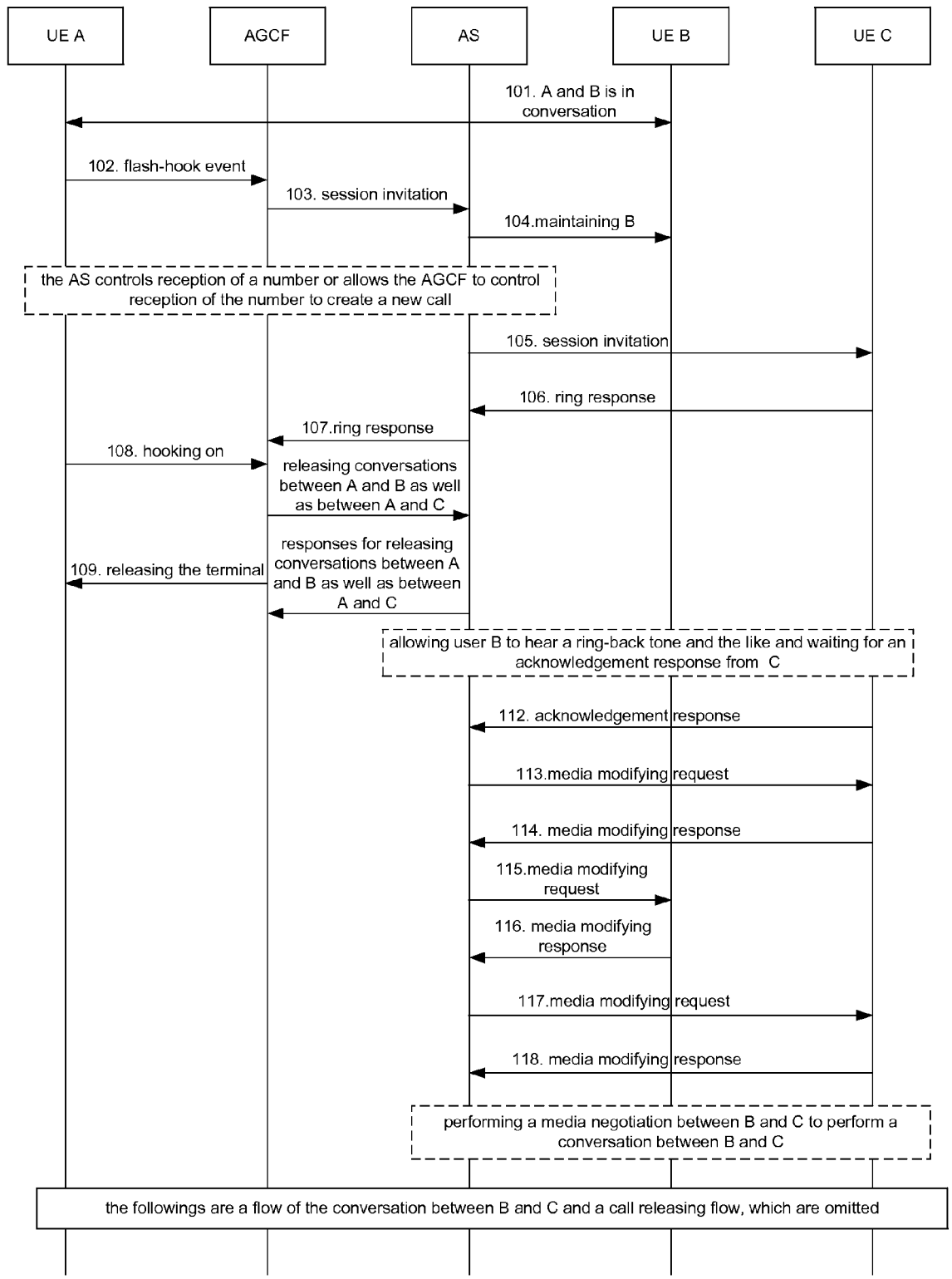
FIG. 1 shows an implementation flow chart of embodiment 1 of the disclosure.

The basic concept of the disclosure is that: after an AGCF user access to the PES via the AGCF, the communication transfer service for the AGCF user is performed by applying a tight/loose coupling mode between the AGCF and the application server (AS) and applying the AS main control/end to end control mode between the AS and non-AGCF users.

The technical solutions will be further described below in details with reference to drawings.

A method for performing a communication transfer service for an AGCF user comprises: after the AGCF user access to the PES via the AGCF, the communication transfer service for the AGCF user is performed by applying a tight/loose coupling mode between the AGCF and the application server (AS) and applying the AS main control/end to end control mode between the AS and non-AGCF users.

Wherein, the end to end control mode refers to an end to end control mode for non-AGCF users. The end to end control mode is equivalent to a peer-to-peer control mode, while the AS main control mode is equivalent to a master-slave control mode.

Hereafter, the specific processing processes of performing the communication transfer service for the AGCF user will be described in scenarios formed by different combinations of the tight coupling, mode, the loose coupling mode, the AS main control mode and the end to end control mode, respectively.

The first scenario is a scenario in which the tight coupling mode and the AS main control mode are applied.

Herein, the performing the communication transfer service specifically comprises:

for the tight coupling mode applied between the AGCF and the AS, after an the AGCF user hooks on, the AGCF sends a call releasing message to the AS for the conversations between the AGCF user and the non-AGCF users, and triggers an interaction in the tight coupling mode between the AGCF and the AS;

for the AS main control mode applied between the AS and non-AGCF users, the AS triggers the AS main control mode by sending media modifying request messages to the non-AGCF users; the non-AGCF users perform a media negotiation in the AS main control mode and implement a conversation between each other.

There are two cases for this scenario, which will be described respectively below.

In the first case, the AGCF user includes a user A, and the non-AGCF users include a user B and a user C; in the case of communication transfer in a ringing state, the performing the communication transfer service further comprises:

for the tight coupling mode applied between the AGCF and the AS, the user A hooks on, the AGCF releases a terminal of the user A; the AGCF sends a call releasing message to the AS for the conversations between the user A and the user B as well as between the user A and the user C, respectively; and the AS sends a release response message to the AGCF for the conversations between the user A and the user B as well as between the user A and the user C, respectively;

for the AS main control mode applied between the AS and the non-AGCF users, after the user C hooks off to send an acknowledgement response message to the AS, the AS sends a media modifying request message to the user C; the user C sends a media modifying response message to the AS; the AS sends a media modifying request message to the user B; the user B sends a media modifying response message to the AS; the AS sends a media modifying request message to the user C; the user C sends a media modifying response message to the AS; a conversation between the user B and the user C is performed.

In the second case, the AGCF user includes a user A, and the non-AGCF users include a user B and a user C; in the case of communication transfer in a conversation state, the performing the communication transfer service further comprises:

for the tight coupling mode applied between the AGCF and the AS, after the user C hooks off to send an acknowledgement response message to the AS, the user A hooks on, the AGCF releases the terminal of the user A; the AGCF sends a call releasing message to the AS for the conversations between the user A and the user B as well as between the user A and the user C, respectively; and the AS sends a release response message to the AGCF for the conversations between the user A and the user B as well as between the user A and the user C, respectively;

for the AS main control mode applied between the AS and the non-AGCF users, the AS sends a media modifying request message to the user C; the user C sends a media modifying response message to the AS; the AS sends a media modifying request message to the user B; the user B sends a media modifying response message to the AS; the AS sends a media modifying request message to the user C; the user C sends a media modifying response message to the AS; a conversation between the user B and the user C is performed.

The second scenario is a scenario in which the tight coupling mode and the end to end mode are applied.

Herein, the performing the communication transfer service specifically comprises:

for the tight coupling mode applied between the AGCF and the AS, after the AGCF user hooks on, the AGCF sends call releasing messages to the AS for the conversations between the AGCF user and the non-AGCF users, and triggers an interaction between the AGCF and the AS in the tight coupling mode; and for the end to end control mode applied between the AS and the non-AGCF users, the AS triggers the end to end control mode by sending call changing request messages to the non-AGCF users; the non-AGCF users perform a media negotiation in the end to end control mode and perform a conversation between each other.

There are two cases for this scenario, which will be described respectively below.

In the first case, the AGCF user includes a user A, and the non-AGCF users include a user B and a user C; in the case of communication transfer in a conversation state, the performing the communication transfer service further comprises:

for the tight coupling mode applied between the AGCF and the AS, after the user C hooks off to send an acknowledgement response message to the AS, the user A hooks on, the AGCF releases a terminal of the user A; the AGCF sends a call releasing message to the AS for the conversations between the user A and the user B as well as between the user A and the user C, respectively; and the AS sends a release response message to the AGCF for the conversations between the user A and the user B as well as between the user A and the user C, respectively; and for the end to end control mode applied between the AS and the non-AGCF users, the AS sends a call changing request message to the user B; the user B sends a call changing request reception message to the AS; the user B sends a call changing start message to the AS; the user B sends a session inviting message to the AS; the AS sends a session inviting message to the user C; the user C sends an acknowledgement response message to the AS; the AS sends an acknowledgement response message to the user B; a conversation between the user B and the user C is performed.

In the second case, the AGCF user includes a user A, and the non-AGCF users include a user B and a user C; in the case of communication transfer in a ringing state, the performing the communication transfer service further comprises:

for the tight coupling mode applied between the AGCF and the AS, after the AGCF user hooks on, the user A hooks on, the AGCF releases a terminal of the user A; the AGCF sends a call releasing message to the AS for the conversations between the user A and the user B as well as between the user A and the user C, respectively; and the AS sends a release response message to AGCF for the conversations between the user A and the user B as well as between the user A and the user C, respectively; and for the end to end control mode applied between the AS and the non-AGCF users, after the user C hooks off to send an acknowledgement response message to the AS, the AS sends a call changing request message to the user B; the user B sends a call changing request reception message to the AS; the user B sends a call changing start message to the AS; the user B sends a session inviting message to the AS; the AS sends a session inviting message to the user C; the user C sends an acknowledgement response message to the AS; the AS sends an acknowledgement response message to the user B; a conversation between the user B and the user C is performed.

The second scenario is a scenario in which the loose coupling mode and the AS main control mode are applied.

Herein, the performing the communication transfer service specifically comprises:

for the loose coupling mode applied, after the AGCF user hooks on, the AGCF triggers an interaction between the AGCF and the AS in the loose coupling mode, by sending a call changing request message to the AS; and for the AS main control mode, the AS triggers the AS main control mode by sending media modifying request messages to the non-AGCF users; the non-AGCF users perform a media negotiation in the AS main control mode and perform a conversation between each other.

There are two cases for this scenario, which will be described respectively below.

In the first case, the AGCF user includes a user A, and non-AGCF users include a user B and a user C; in the case of communication transfer in a conversation state, the performing the communication transfer service further comprises:

for the loose coupling mode applied, after the user C hooks off to send an acknowledgement response message is to the AS, the user A hooks on, AGCF releases a terminal of the user A; the AGCF sends a call changing request message to the AS; the AS sends a call changing start message to the AGCF; the AS sends a call changing success message to the AGCF; the AS sends a call releasing message to is the AGCF for the call between the user A and the user C; the AGCF sends a call releasing message to the AS for the call between the user A and the user B; and for the AS main control mode, the AS sends a media modifying request message to the user C; the user C sends a media modifying response message to the AS; the AS sends a media modifying request message to the user B; the user B sends a media modifying response message to the AS; the AS sends a media modifying request message to the user C; the user C sends a media modifying response message to the AS; a conversation between the user B and the user C is performed.

In the second case, the AGCF user includes a user A, and the non-AGCF users include a user B and a user C; in the case of communication transfer in a ringing state, the performing the communication transfer service further comprises:

for the loose coupling mode applied, the user A hooks on, the AGCF releases the terminal of the user A; the AGCF sends a call changing request message to the AS; the AS sends a call changing request reception message to the AGCF; the AS sends a call changing start message to the AGCF; the AS sends a call changing success message to the AGCF; the AS sends a call releasing message to the AGCF for the call between the user A and the user C; the AGCF sends a call releasing message to the AS for the call between the user A and the user B;

for the AS main control mode, after the user C hooks off to send an acknowledgement response message to the AS, the AS sends a media modifying request message to the user C; the user C sends a media modifying response message to the AS; the AS sends a media modifying request message to the user B; the user B sends a media modifying response message to the AS; the AS sends a media modifying request message to the user C; the user C sends a media modifying response message to the AS; a conversation between the user B and the user C is performed.

The fourth scenario is a scenario in which the loose coupling mode and the end to end control mode are applied.

Herein, the performing the communication transfer service specifically comprises:

for the loose coupling mode applied, after the AGCF user hooks on, the AGCF triggers an interaction between the AGCF and the AS in the loose coupling mode, by sending a call changing request message to the AS; and for the end to end control mode, the AS triggers the end to end control mode by sending call changing request messages to the non-AGCF users; the non-AGCF users perform a media negotiation in the end to end control mode and perform a conversation between each other.

There are two cases for this scenario, which will be described respectively below.

In the first case, the AGCF user includes a user A, and the non-AGCF users include a user B and a user C; in the case of communication transfer in a conversation state, the performing the communication transfer service further comprises:

for the loose coupling mode applied, after the user C hooks off to send an acknowledgement response message to the AS, the user A hooks on, the AGCF releases a terminal of the user A; the AGCF sends a call changing request message to the AS; the AS sends a call changing request reception message to the AGCF; the AS sends a call changing start message to the AGCF; the AS sends a call releasing message to the AGCF for the call between the user A and the user C; the AS sends a call changing success message to the AGCF; the AGCF sends a call releasing message to the AS for the call between the user A and the user B;

for the end to end control mode, the AS sends a call changing request message to the user B; the user B sends a call changing request reception message to the AS; the user B sends a call changing start message to the AS; the user B sends a session inviting message to the AS; the AS sends a session inviting message to the user C; the user C sends an acknowledgement response message to the AS; the AS sends an acknowledgement response message to the user B; a conversation between the user B and the user C is performed.

In the second case, the AGCF user includes a user A, and the non-AGCF users include a user B and a user C; in the case of communication transfer in a ringing state, the performing the communication transfer service further comprises:

for the loose coupling mode applied, the user A hooks on, the AGCF releases the terminal of the user A; the AGCF sends a call changing request message to the AS; the AS sends a call changing request reception message to the AGCF; the AS sends a call changing start message to the AGCF; the AS sends a call releasing message to the AGCF for the call between the user A and the user C; the AS sends a call changing success message to the AGCF; the AGCF sends a call releasing message to the AS for the call between the user A and the user B;

for the end to end control mode, after the user C hooks off to send an acknowledgement response message to the AS, the AS sends a call changing request message to the user B; the user B sends a call changing request reception message to the AS; the user B sends a call changing start message to the AS; the user B sends a session inviting message to the AS; the AS sends a session inviting message to the user C; the user C sends an acknowledgement response message to the AS; AS sends an acknowledgement response message to the user B; a conversation between the user B and the user C is performed.

The disclosure will be described below by way of examples.

Embodiment 1: a case for communication transfer in a ringing state and in the tight coupling and AS main control modes. As shown in FIG. 1, the implementation flow of the embodiment comprises the following steps:

S101: A conversation between the user A and the user B of the AGCF has been established according to the prior art.

Herein, the user B is not required to be an AGCF user, but may be a non-AGCF user. The descriptions of the user B involved in the following embodiments are the same as the above and will be omitted hereafter.

S102: The user A flashes the hook to send a NOTIFY message to the AGCF.

S103: The AFCF creates a new call for the flash-hook event of the user A, and initiates a call to the AS. The call is a session inviting message in the SIP, specifically.

S104: The AS sends a media modifying request message to the opposite end of the user A, namely the user B, sets a proper media status, and maintains the user B. The message is a RE-INVITE message in the SIP, specifically.

Hereafter, the AS may control the media server to play a dial tone for the user A, allowing the user A to input the number of the user C; or, the AS may reply to the AGCF with a failure response message for an incomplete number, allowing the AGCF to control the media server to play the dial tone for the user A, which allows the user A to input the number of the user C and to create a new call.

S105: The AS initiates a call to the user C, the call being an INVITE message in the SIP.

S106-S107: The user C replies to the user A through the AS with a ring response message which is a 18x message in the SIP. The user A will hear the ring-back tone or other prompt tones.

S108-S109: The user A hooks on and the AGCF releases a terminal of the user A.

S110-S111: The AGCF respectively sends a call releasing message to the AS for the conversations between the user A and the user B as well as between the user A and the user C, the message being a BYE message in the SIP; the AS will release an acknowledgement response message for the conversations between the user A and the user B as well as between the user A and the user C, respectively, the message being a 200 OK message in SIP. Hereafter, the AS allows the user B to hear a ring-back tone or other prompt tones by way of media negotiation and the like, according to its own logic and demands of different customers, and waits for an acknowledgement response from the user C.

S112: The user C hooks off to send an acknowledgement response message to the AS, the message being the 200 OK message in the SIP.

S113-S118: The user B and the user C perform a media negotiation under the control of the AS, and perform a conversation between each other.

Figure 2:
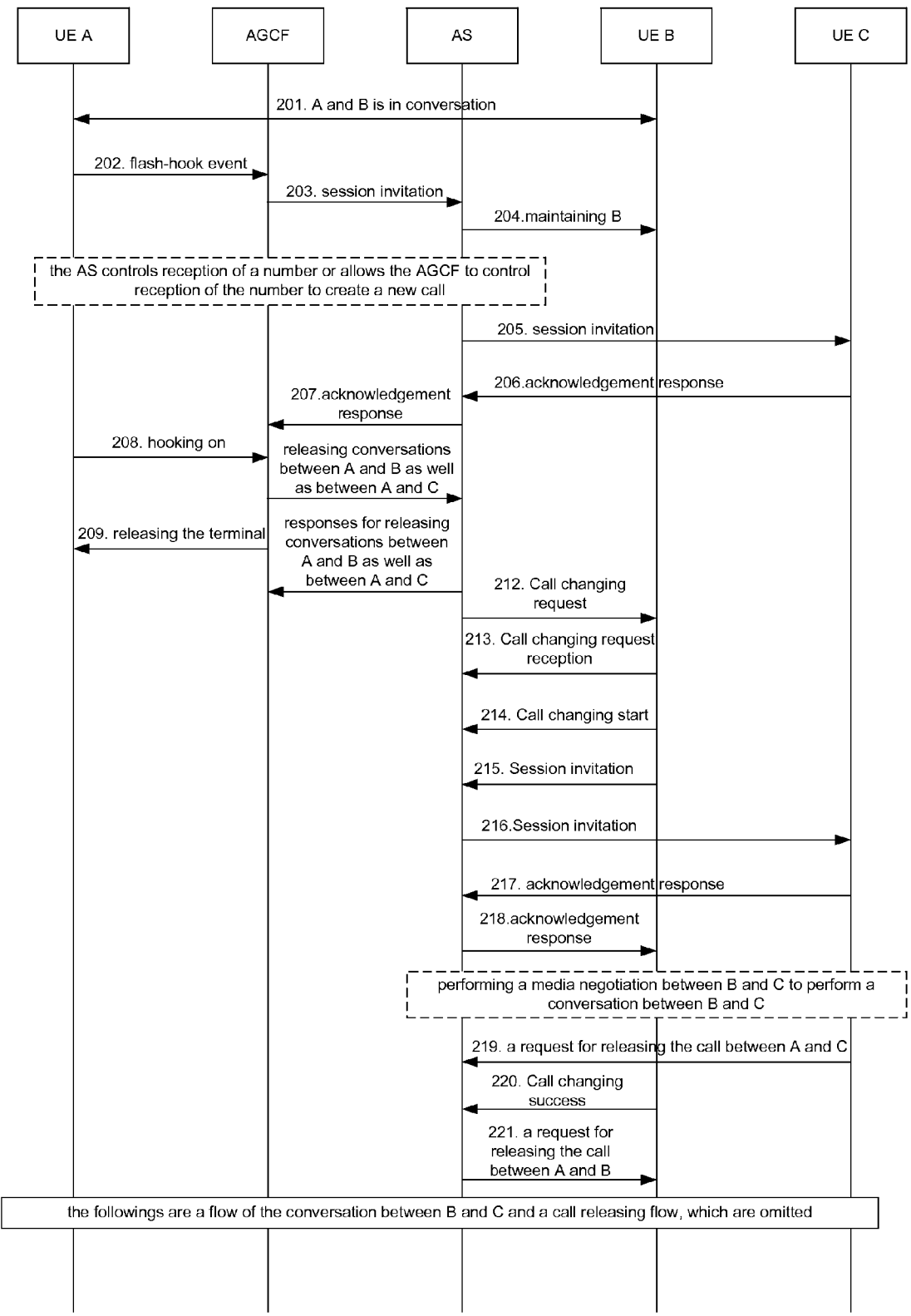
FIG. 2 shows the implementation flow chart of embodiment 2 of the disclosure.

Embodiment 2: a case for communication transfer in a conversation state in the end to end and tight coupling modes. As shown in FIG. 2, the implementation flow of the embodiment comprises the following steps:

S201: A conversation between the user A and the user B of the AGCF has been established according to the prior art.

S202: The user A flashes the hook to send a NOTIFY message to the AGCF.

S203: The AFCF creates a new call for the flash-hook event of the user A, and initiates a call to the AS. The call is an INVITE message in the SIP, specifically.

S204: The AS sends a media modifying request message to the opposite end of the user A, namely the user B, sets a proper media status, and maintains the user B. The message is a RE-INVITE message in the SIP, specifically.

Hereafter, the AS may control the media server to play a dial tone for the user A, allowing the user A to input the number of the user C; or, the AS may reply to the AGCF with a failure response message for an incomplete number, allowing the AGCF to control the media server to play the dial tone for the user A, which allows the user A to input the number of the user C and to create a new call.

S205: The AS initiates a call to the user C, the call being an INVITE message in the SIP.

S206-S207: The user C hooks off (other temporary responses are ignored here) to send an acknowledgement response message to the AGCF through the AS, the message being a 200 OK message in the SIP. A conversation between the user A and the user C are performed.

S208-209: The user A hooks on and the AGCF releases a terminal of the user A.

S210-S211: The AGCF sends a call releasing message to the AS for the conversations between the user A and the user B as well as between the user A and the user C, respectively, the message being a BYE message in the SIP; the AS will is release an acknowledgement response message for the conversations between the user A and the user B as well as between the user A and the user C, respectively, the message being 200 OK message in SIP.

S212: The AS sends a call changing request message to the user B, the message being a REFER message in the SIP.

S213: The user B replies to the AS with a call changing request reception message, the message being a message of class 200 in the SIP, such as 202.

S214: The user B sends a call changing start message to the AS, the message being a NOTIFY message in the SIP, with a 100 trying instruction therein. The AS will reply to the user B with a 200 OK response, which is ignored in the flow chart.

S215-S216: The user B sends a session inviting message to the user C through the AS, the message being an INVITE message in the SIP.

S217-S218: The user C sends an acknowledgement response message to the user B through the AS, and a conversation between the user B and the user C is performed, the message being a 200 OK message in the SIP.

S219: Upon reception of an acknowledge message of the acknowledgement response, the user C sends a message of releasing the conversation between the user A and the user C to the AS to release the conversation between the user A and the user C, the message being a BYE message in the SIP.

S220: Upon reception of the acknowledgement response message, the user B sends a call changing success message to the AS, the message, with a 200 OK instruction therein, being a NOTIFY message in the SIP.

S221: Upon reception of the call changing success message, the AS sends a call releasing request message to the user B for the conversation between the user A and the user B.

Figure 3:
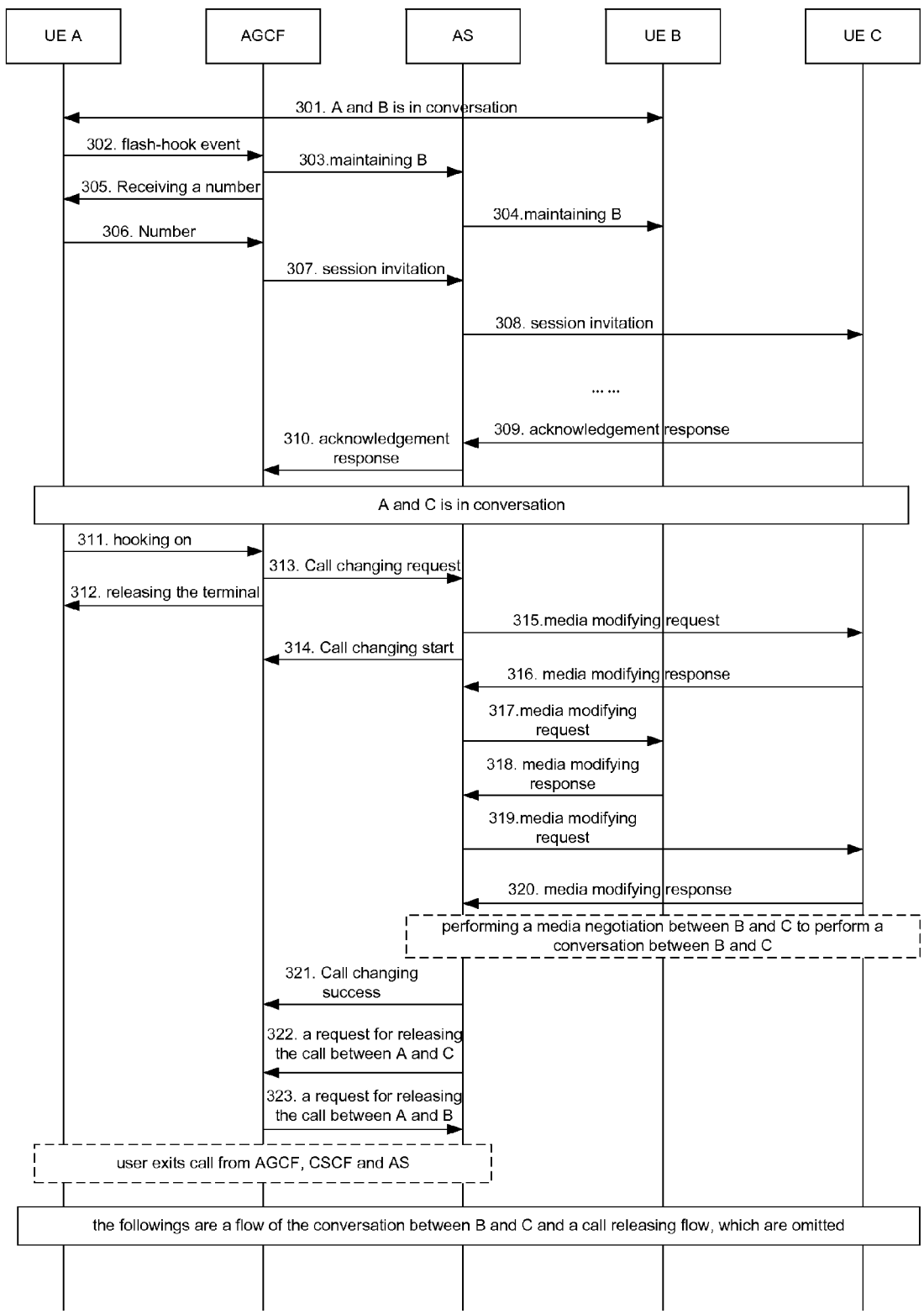
FIG. 3 shows the implementation flow chart of embodiment 3 of the disclosure.

Embodiment 3: a case for communication transfer in a conversation state, in the loose coupling and AS main control modes. As shown in FIG. 3, the implementation is flow of the embodiment comprises the following steps:

S301: A conversation between the user A and the user B of the AGCF has been established according to the prior art.

S302: The user A flashes the hook to send a NOTIFY message to the AGCF.

S303-S304: AGCF maintains the opposite end of the user A, namely the user B through the AS, the message being a RE-INVITE message in the SIP. The response message 200 OK of RE-INVITE is ignored in the flow chart.

S305-S306: The AGCF plays a dial prompt tone for the user A, and the user A inputs the number of the user C.

S307-S308: The AGCF creates a new call for the user A and calls the user C through the AS, the call being an INVITE message in the SIP.

S309-S310: The user C hooks off to send an acknowledgement response message to the user A through the AS to perform a conversation between the user A and the user C, the message being a 200 OK message in the SIP. Before this, there may be some temporary response messages that are ignored herein.

S311-S312: The user A hooks on, and the AGCF releases a terminal of the user A.

S313: The AGCF sends a call changing request message to the AS, the message being a REFER message in the SIP.

S314: The AS sends a call changing start message to the AGCF, the message, with a 100 trying instruction therein, being a NOTIFY message in the SIP. The call changing request reception message with which the AS replies is a message of class 200 in the SIP, such as 202, which is ignored in the flow chart.

S315-S320: The AS imitates a media negotiation between the user B and the user C to perform a conversation between the user B and the user C.

S321: The AS notifies AGCF that communication transfer service is performed successfully with a message, which, with a 200 OK instruction therein, is a NOTIFY message in the SIP.

S322: The AS sends a BYE message to the AGCF for the call of the user A to the user C, and releases the conversation between the user A and the user C. The response message 200 OK with which the AGCF replies is ignored in the flow chart.

S323: The AGCF sends a BYE message to the AS for the call of the user A to the user B, and releases the conversation between the user A and the user B. The response message 200 OK with which the AS replies is ignored in the flow chart.

Figure 4:
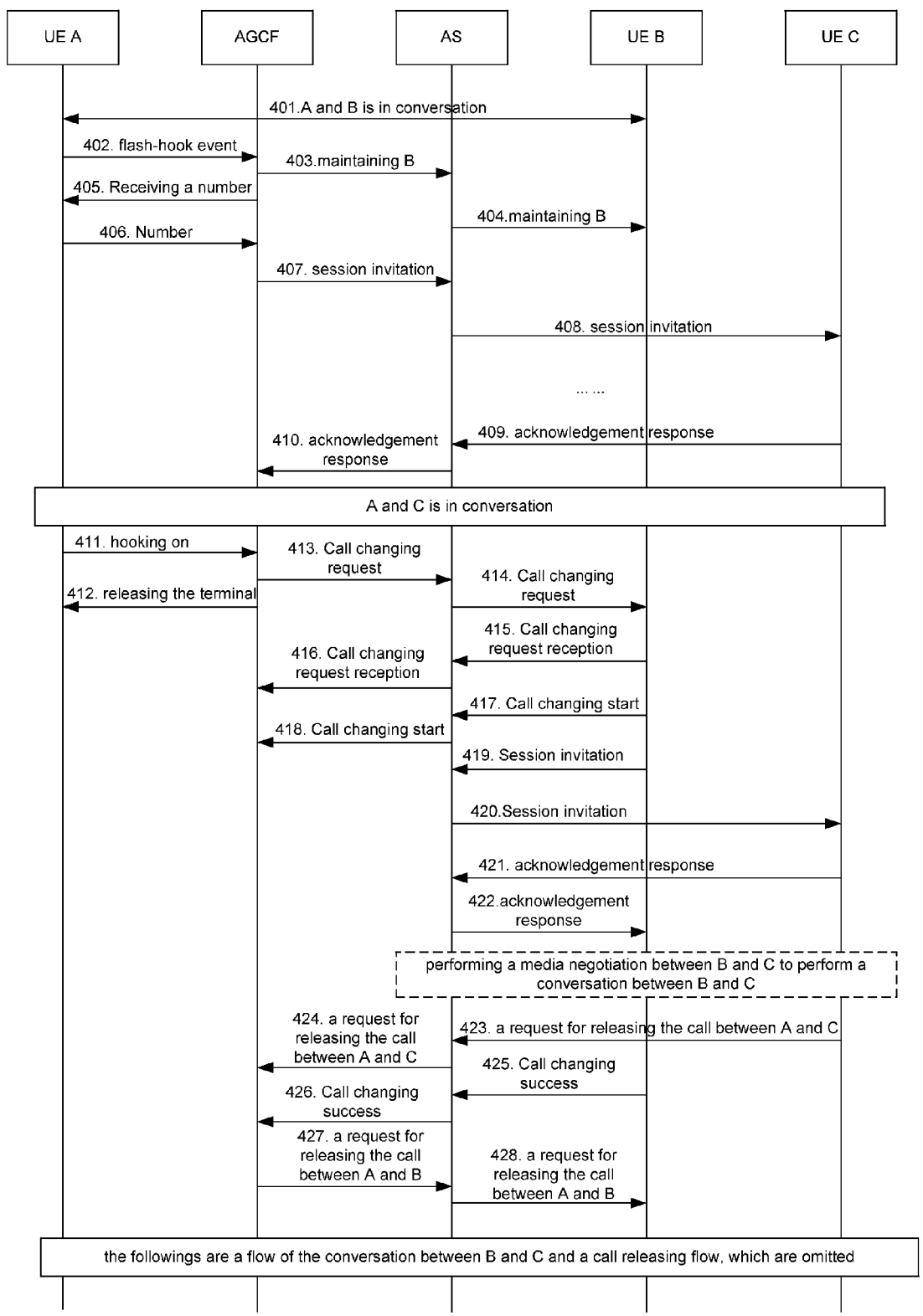
FIG. 4 shows the implementation flow chart of embodiment 4 of the disclosure.

Embodiment 4: a case for communication transfer in a conversation state in the end to end control and loose coupling modes. As shown in FIG. 4, the implementation flow of the embodiment comprises the following steps:

S401: A conversation between the user A and the user B of the AGCF has been established according to the prior art.

S402: The user A flashes the hook to send a NOTIFY message to the AGCF.

S403-S404: The AGCF maintains the opposite end of the user A, namely the user B through the AS, the message being a RE-INVITE message in the SIP. The response message 200 OK of RE-INVITE is ignored in the flow chart.

S405-S406: The AGCF plays a dial prompt tone for the user A, and the user A inputs the number of the user C.

S407-S408: The AGCF creates a new call for the user A and calls the user C through the AS, the call being an INVITE message in the SIP.

S409-S410: The user C hooks off to send an acknowledgement response message to the user A through the AS to perform a conversation between the user A and the user C, the message being a 200 OK message in the SIP. Before this, there may be some temporary response messages that are ignored herein.

S411-S412: The user A hooks on, and the AGCF releases a terminal of the user A.

S413: The AGCF sends a call changing request message to the AS, the message being a REFER message in the SIP.

S414: The AS sends a call changing request message to the user B, the message being a REFER message in the SIP.

S415-S416: The user B replies to the AGCF with a call changing request reception message through the AS. The message is a message of class 200 in the SIP, such as 202.

S417-S418: The user B sends a call changing start message to the AGCF through the AS, the message, with a 100 trying instruction therein, being a NOTIFY message in the SIP. The AGCF will reply to the user B with a 200 Ok response through the AS, which is ignored in the flow chart.

S419-S420: The user B sends a session inviting message to the user C through the AS, the message being an INVITE message in the SIP.

S412-422: The user C sends an acknowledgement response message to the user B through AS, and a conversation between the user B and the user C is performed, the message being a 200 OK message in the SIP.

S423-S424: Upon reception of an acknowledgement message of the acknowledgement response, the user C sends a message of releasing the conversation between the user A and the user C to the AGCF through the AS to release the conversation between the user A and the user C, the message being a BYE message in the SIP.

S425-S426: Upon reception of the acknowledgement response message, the user B sends a call changing success message to the AGCF through the AS, the message being a NOTIFY message in the SIP, with a 200 OK instruction therein.

S427-S428: Upon reception of the call changing success message, the AGCF sends a call releasing request message to the user B through the AS for the conversation between the user A and the user B.

Figure 5:
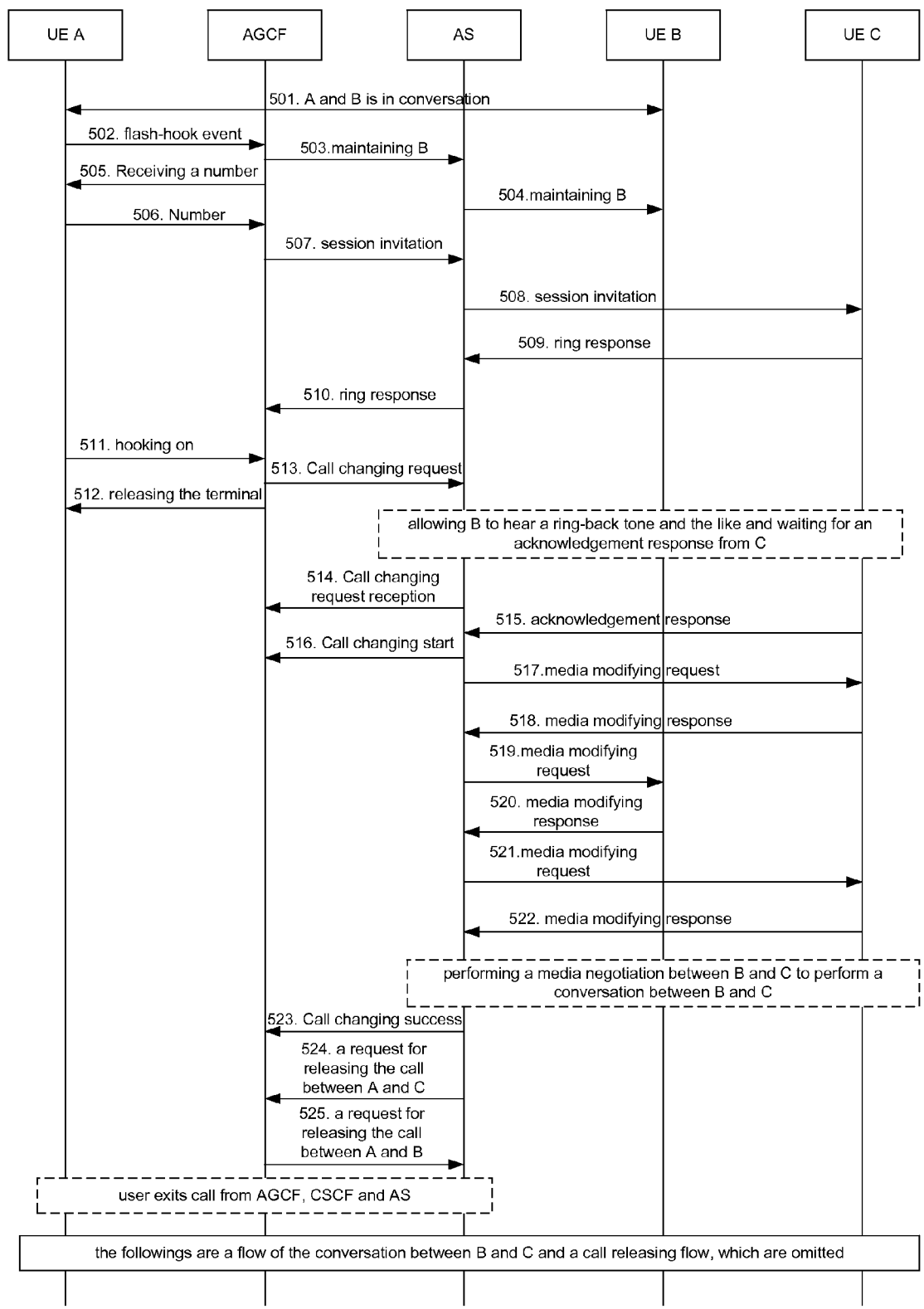
FIG. 5 shows the implementation flow chart of embodiment 5 of the disclosure.

Embodiment 5: a case for communication transfer in a ringing state, in the loose coupling and AS main control modes. As shown in FIG. 5, the implementation flow of is the embodiment comprises the following steps:

S501: A conversation between The user A and the user B of the AGCF has been established according to the prior art.

S502: The user A flashes the hook to send a NOTIFY message to the AGCF.

S503-S504: The AGCF maintains the opposite end of the user A, namely the user B through the AS, the message being a RE-INVITE message in the SIP. The response message 200 OK of RE-INVITE is ignored in the flow chart.

S505-S506: The AGCF plays a dial prompt tone for the user A, and the user A inputs the number of the user C.

S507-S508: The AGCF creates a new call for the user A and calls the user C through the AS, the call being an INVITE message in the SIP.

S509-S510: The user C replies to the user A through the AS with a ring response message, the message being a 18x message in the SIP. The user A will hear a ring-back tone or other prompt tones.

S511-S512: The user A hooks on and the AGCF releases a terminal of the user A.

S513: The user A hooks on, the AGCF sends a call releasing request message to the AS, the message being a REFER message in the SIP.

S514: The AS sends a call changing request reception message to the AGCF, the message being a message of class 200 in the SIP, such as 202. Hereafter, the AS allows the user B to hear a ring-back tone or other prompt tones by way of media negotiations according to its own logic and demands of different customers, and waits for an acknowledgement response from the user C.

S515: The user C hooks off to send an acknowledgement response message to the AS, the message being 200 OK message in the SIP.

S516: The AS sends a call changing start message to the AGCF, the message, with a 100 trying instruction therein, being a NOTIFY message in the SIP.

S517-S522: The AS imitates a media negotiation between the user B and the user is C, such that a conversation between the user B and the user C is performed.

S523: The AS notifies the AGCF that communication transfer service is performed successfully with a message, which, with a 200 OK instruction therein, is a NOTIFY message in the SIP.

S524: The AS sends a BYE message to the AGCF for the call of the user A to the user C, to release the conversation between the user A and the user B. The response message 200 OK with which the AGCF replies is ignored in the flow chart.

S525: The AGCF sends a BYE message to the AS for the call of the user A to the user C, to release the conversation between the user A and the user C. The response message 200 OK with which the AS replies is ignored in the flow chart.

Figure 6:
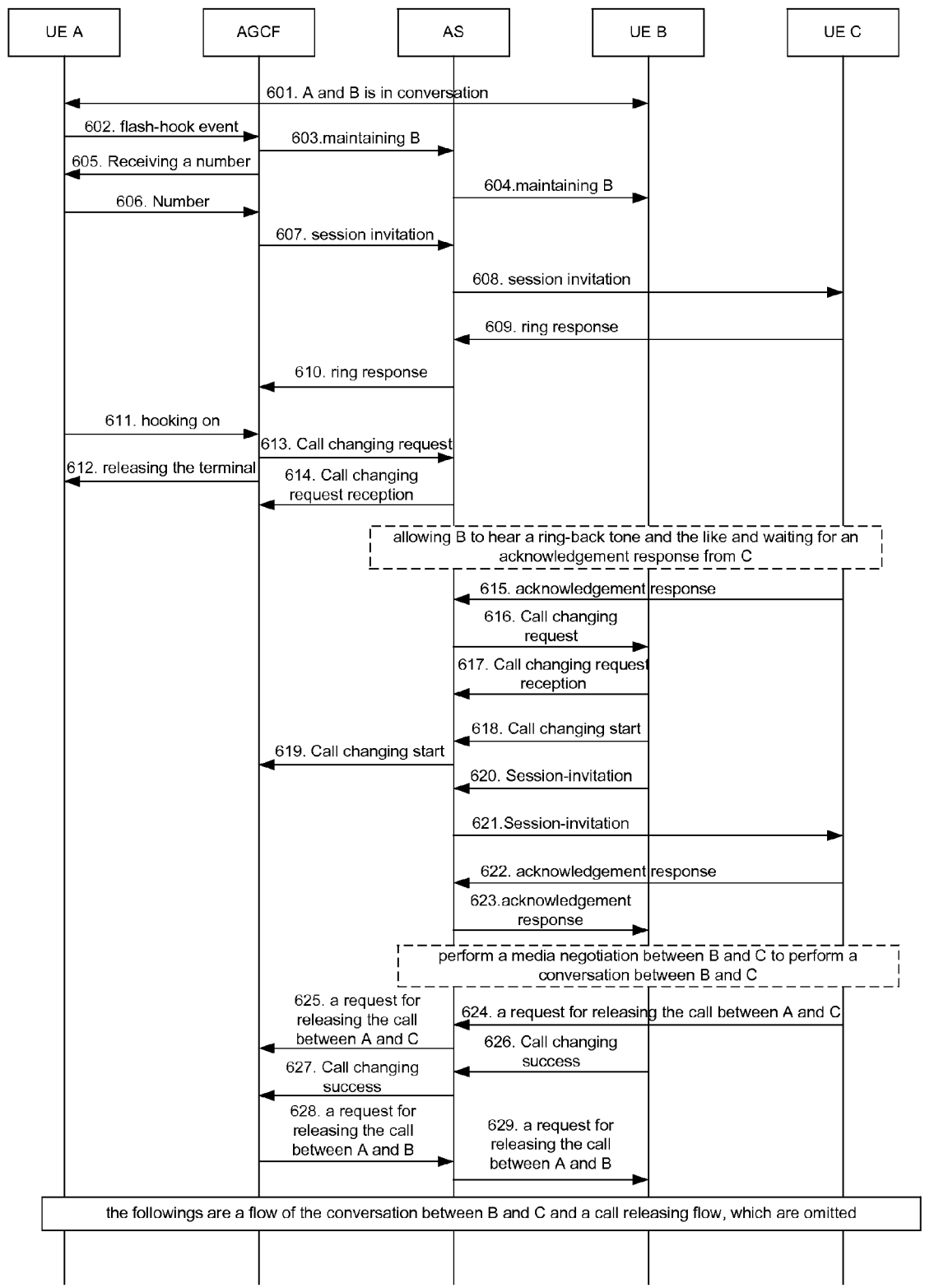
FIG. 6 shows the implementation flow chart of embodiment 6 of the disclosure.

Embodiment 6: a case for communication transfer in a ringing state and in the end to end control and loose coupling modes. As shown in FIG. 6, the implementation flow of the embodiment comprises the following steps:

S601: A conversation between the user A and the user B of the AGCF has been established according to the prior art.

S602: The user A flashes the hook to send a NOTIFY message to the AGCF.

S603-S604: The AGCF maintains the opposite end of the user A, namely the user B through the AS, the message being a RE-INVITE message in the SIP. The response message 200 OK of RE-INVITE is ignored in the flow chart.

S605-S606: The AGCF plays a dial prompt tone for the user A, and the user A inputs the number of the user C.

S607-S608: The AGCF creates a new call for the user A and calls the user C through the AS, the call being an INVITE message in the SIP.

S609-S610: The user C replies to the user A through the AS with a ring response message, the message being a 18x message in the SIP. The user A will hear a ring-back tone or other prompt tones.

S611-S612: The user A hooks on, and the AGCF releases a terminal of the user A.

S613: The user A hooks on, and the AGCF sends a call changing request message to the AS, the message being a REFER message in the SIP.

S614: The AS sends a call changing request reception message to the AGCF, the message being a message of class 200 in the SIP, such as 202. Hereafter, the AS allows the user B to hear a ring-back tone or other prompt tones by way of media negotiation and the like, according to its own logic and demands of different customers, and waits for an acknowledgement response from the user C.

S615: The user C hooks off to send an acknowledgement response message to the AS, the message being a 200 OK message in the SIP.

S616: The AS sends a call changing request message to the user B, the message being a REFER message in the SIP.

S617: The user B replies to the AS with a call changing request reception message. The message is a message of class 200 in the SIP, such as 202.

S618-S619: The user B sends a call changing start message to the AS, the message, with a 100 trying instruction therein, being a NOTIFY message in the SIP. The AGCF will reply to the user B through the AS with a 200 OK response, which is ignored in the flow chart.

S620-S621: The user B sends a session inviting message to the user C through the AS, the message being an INVITE message in the SIP.

S622-S623: The user C sends an acknowledgement response message to the user B through the AS, such that a conversation between the user B and the user C is performed, the message being a 200 OK message in the SIP.

S624-S625: Upon reception of an acknowledgement message of the acknowledgement response, the user C sends a message of releasing the conversation between the user A and the user C to the AGCF through the AS to release the conversation between the user A and the user C, the message being a BYE message in the SIP.

S626-S627: Upon reception of the acknowledgement response message, the user B sends a call changing success message to the AGCF through the AS, the message, with a 200 OK instruction therein, being a NOTIFY message in the SIP.

S628-S629: Upon reception of the call changing success message, the AGCF sends a call releasing request message to the user B through the AS for the conversation between the user A and the user B.

It should be noted that above contents are just descriptions of principles of the disclosure, and thus, I) flows in the embodiments are just exemplary flows;
II) the network elements, i.e., the AGCF and the AS, and messages therebetween in the embodiments are mainly provided to clearly express the concept of performing the communication transfer service for the AGCF user. In specific implementations, the disclosure is not limited to these network elements and messages;
III) abnormal flows or situations occurring in the various flows, sequence of some messages and specific implementations within the network elements are not limited specifically, if possible;
IV) the embodiments of the disclosure provide two implementation forms, end to end and controlling by the AS, but other implementation ways should not be excluded; and
V) although descriptions of precondition, transcoding, P-early-media and early session that may be involved for call are not provided in the embodiments of the disclosure, these aspects should be considered in actual applications.

CSCF involved in FIG. 3 and FIG. 5 means call session control function. Besides, it should be noted that AGCF user mentioned in the text for many times means a user belonging to the AGCF, namely a service user of communication transfer; while the involved non-AGCF user means a non-service user of communication transfer, the non-AGCF user is not required to be a user belonging to the AGCF, of course, the non-AGCF users may be users belonging to the AGCF, or any user in the PES network.

A system for performing a communication transfer service for an AGCF user comprises: a communication transfer performing unit configured to access to a PES though the AGCF by an AGCF user, wherein a tight/loose coupling is employed between the AGCF and an AS; and communication transfer service for AGCF users is performed between the AS and a non-AGCF user in the AS main control mode/end to end control mode.

Herein, the specific implementations of the communication transfer performing unit are different in different scenarios, which will be described below respectively.

The first specific implementation: in a scenario in which the tight coupling mode and the AS main control mode are applied, the communication transfer unit is further configured to such that after the AGCF user hooks on, the AGCF sends call releasing messages to the AS for the conversations between the AGCF user and the non-AGCF users, and triggers an interaction in the tight coupling mode between the AGCF and the AS. The AS triggers the AS main control mode, by sending a media modifying request message to the non-AGCF users; the non-AGCF users perform a media negotiation in the AS main control mode and perform a conversation between each other.

Second specific implementation: in a scenario in which the tight coupling mode and the end-to end control mode are applied, the communication transfer unit is further configured to such that after the AGCF user hooks on, the AGCF sends call releasing messages to the AS for the conversations between the AGCF user and the non-AGCF users, and triggers an interaction in the tight coupling mode between the AGCF and the AS. The AS triggers the end to end control mode by sending call changing request messages to the non-AGCF users; the non-AGCF users perform media negotiations in the end to end control mode and perform a conversation between each other.

Third specific implementation: in a scenario in which the loose coupling mode and the AS main control mode are applied, the communication transfer unit is further configured to such that after the AGCF user hooks on, the AGCF triggers an interaction in the loose coupling mode between the AGCF and the AS by sending a call changing request message to the AS. The AS triggers the AS main control mode by sending media modifying request messages to the non-AGCF users; the non-AGCF users perform a media negotiation in the AS main control mode and perform a conversation between each other.

Fourth specific implementation: in a scenario in which the loose coupling mode and the end-to end control mode are applied, the communication transfer unit is further configured to such that after the AGCF user hooks on, the AGCF triggers an interaction in the loose coupling mode between the AGCF and the AS by sending a call changing request message to the AS. The AS triggers the end to end control mode by sending call changing request messages to the non-AGCF users; the non-AGCF users perform a media negotiation in the end to end control mode and perform a conversation between each other.

Above contents are just preferred embodiments of the disclosure and are not intended to limit the protection scope of the disclosure.

The invention claimed is:

1. A method of performing a communication transfer service for an access gateway control function (AGCF) user, comprising: after the AGCF user accesses to a public Switched Telephone Network/Integrated Services Digital Network Emulation Subsystem (PSTN/ISDN Emulation Subsystem (PES)), performing the communication transfer service for the AGCF user, by applying a tight/loose coupling mode between an AGCF and an application server (AS) and by applying an AS main control/end to end control mode between the AS and non-AGCF users.

2. The method according to claim 1, wherein the performing the communication transfer service by applying the tight coupling mode and by applying the AS main control mode comprises:

after the AGCF user hooks on, the AGCF sends call releasing messages to the AS for the conversations between the AGCF user and the non-AGCF users, and triggers an interaction between the AGCF and the AS in the tight coupling mode; and the AS triggers the AS main control mode by sending media modifying request messages to the non-AGCF users, who perform a media negotiation in the AS main control mode and a conversation between each other.

3. The method according to claim 2, wherein the AGCF user includes a user A, and the non-AGCF users include a user B and a user C; in the case of communication transfer in a ringing state, the performing the communication transfer service further comprises:

the user A hooks on, the AGCF releases a terminal of the user A; the AGCF sends a call releasing message to the AS for the conversations between the user A and the user B as well as between the user A and the user C, respectively; and the AS sends a release response message to the AGCF for the conversations between the user A and the user B as well as between the user A and the user C, respectively;

after the user C hooks off to send an acknowledgement response message to the AS, the AS sends a media modifying request message to the user C; the user C sends a media modifying response message to the AS; the AS sends a media modifying request message to the user B; the user B sends a media modifying response message to the AS; the AS sends a media modifying request message to the user C; the user C sends a media modifying response message to the AS; a conversation between the user B and the user C is performed;

or, the AGCF user includes a user A, and the non-AGCF users include a user B and a user C; in the case of communication transfer in a conversation state, the performing the communication transfer service further comprises:

after the user C hooks off to send an acknowledgement response message to the AS, the user A hooks on, the AGCF releases the terminal of the user A; the AGCF sends a call releasing message to the AS for the conversations between the user A and the user B as well as between the user A and the user C, respectively; and the AS sends a release response message to the AGCF for the conversations between the user A and the user B as well as between the user A and the user C, respectively; the AS sends a media modifying request message to the user C; the user C sends a media modifying response message to the AS; the AS sends a media modifying request message to the user B; the user B sends a media modifying response message to the AS; the AS sends a media modifying request message to the user C; the user C sends a media modifying response message to the AS; a conversation between the user B and the user C is performed.

4. The method according to claim 1, wherein the performing the communication transfer service by applying the tight coupling mode and by applying the end to end control mode comprises:
after the AGCF user hooks on, the AGCF sends call releasing messages to the AS for the conversations between the AGCF user and the non-AGCF users, and triggers an interaction between the AGCF and the AS in the tight coupling mode; and
the AS triggers the end to end control mode by sending call changing request messages to the non-AGCF users, who perform a media negotiation in the end to end control mode and a conversation between each other.

5. The method according to claim 4, wherein the AGCF user includes a user A, and the non-AGCF users include a user B and a user C; in the case of communication transfer in a conversation state, the performing the communication transfer service further comprises:
after the user C hooks off to send an acknowledgement response message to the AS, the user A hooks on, the AGCF releases a terminal of the user A; the AGCF sends a call releasing message to the AS for the conversations between the user A and the user B as well as between the user A and the user C, respectively; and the AS sends a release response message to the AGCF for the conversations between the user A and the user B as well as between the user A and the user C, respectively; and
the AS sends a call changing request message to the user B; the user B sends a call changing request reception message to the AS; the user B sends a call changing start message to the AS; the user B sends a session inviting message to the AS; the AS sends a session inviting message to the user C; the user C sends an acknowledgement response message to the AS; the AS sends an acknowledgement response message to the user B; a conversation between the user B and the user C is performed;
or, the AGCF user includes a user A, and the non-AGCF users include a user B and a user C; in the case of communication transfer in a ringing state, the performing the communication transfer service further comprises:
the user A hooks on, the AGCF releases a terminal of the user A; the AGCF sends a call releasing message to the AS for the conversations between the user A and the user B as well as between the user A and the user C, respectively; and the AS sends a release response message to the AGCF for the conversations between the user A and the user B as well as between the user A and the user C, respectively; and
after the user C hooks off to send an acknowledgement response message to the AS, the AS sends a call changing request message to the user B; the user B sends a call changing request reception message to the AS; the user B sends a call changing start message to the AS; the user B sends a session inviting message to the AS; the AS sends a session inviting message to the user C; the user C sends an acknowledgement response message to the AS; the AS sends an acknowledgement response message to the user B; a conversation between the user B and the user C is performed.

6. The method according to claim 1, wherein the performing the communication transfer service by applying the loose coupling mode and applying the AS main control mode comprises:
after the AGCF user hooks on, the AGCF triggers an interaction between the AGCF and the AS in the loose coupling mode, by sending a call changing request message to the AS; and
the AS triggers the AS main control mode by sending media modifying request messages to the non-AGCF users, who perform a media negotiation in the AS main is control mode and a conversation between each other.

7. The method according to claim 6, wherein the AGCF user includes a user A, and the non-AGCF users include a user B and a user C; in the case of communication transfer in a conversation state, the performing the communication transfer service further comprises:
after the user C hooks off to send an acknowledgement response message is to the AS, the user A hooks on, the AGCF releases a terminal of the user A; the AGCF sends a call changing request message to the AS; the AS sends a call changing start message to the AGCF; the AS sends a call changing success message to the AGCF; the AS sends a call releasing message to the AGCF for the call between the user A and the user C; the AGCF sends a call releasing message to the AS for the call between the user A and the user B; and
the AS sends a media modifying request message to the user C; the user C sends a media modifying response message to the AS; the AS sends a media modifying request message to the user B; the user B sends a media modifying response message to the AS; the AS sends a media modifying request message to the user C; the user C sends a media modifying response message to the AS; a conversation between the user B and the user C is performed;
or, the AGCF user includes a user A, and the non-AGCF users include a user B and a user C; in the case of communication transfer in a ringing state, the performing the communication transfer service further comprises:
the user A hooks on, the AGCF releases the terminal of the user A; the AGCF sends a call changing request message to the AS; the AS sends a call changing request reception message to the AGCF; the AS sends a call changing start message to the AGCF; the AS sends a call changing success message to the AGCF; the AS sends a call releasing message to the AGCF for the call between the user A and the user C; the AGCF sends a call releasing message to the AS for the call between the user A and the user B;
after the user C hooks off to send an acknowledgement response message to the AS, the AS sends a media modifying request message to the user C; the user C sends a media modifying response message to the AS; the AS sends a media modifying request message to the user B; the user B sends a media modifying response message to the AS; the AS sends a media modifying request message to the user C; the user C sends a media modifying response message to the AS; a conversation between the user B and the user C is performed.

8. The method according to claim 1, wherein the performing the communication transfer service by applying the loose coupling mode and applying the end to end mode comprises:
after the AGCF user hooks on, the AGCF triggers an interaction between the AGCF and the AS in the loose coupling mode, by sending a call changing request message to the AS; and the AS triggers the end to end control mode by sending call changing request messages to the non-AGCF users, who perform a media negotiation in the end to end control mode and a conversation between each other.

9. The method according to claim 8, wherein the AGCF user includes a user A, and the non-AGCF users include a user B and a user C; in the case of communication transfer in a conversation state, the performing the communication transfer service further comprises:

after the user C hooks off to send an acknowledgement response message to the AS, the user A hooks on, the AGCF releases a terminal of the user A; the AGCF sends a call changing request message to the AS; the AS sends a call changing request reception message to the AGCF; the AS sends a call changing start message to the AGCF; the AS sends a call releasing message to the AGCF for the call between the user A and the user C; the AS sends a call changing success message to the AGCF; the AGCF sends a call releasing message to the AS for the call between the user A and the user B;

The AS sends a call changing request message to the user B; the user B sends a call changing request reception message to the AS; the user B sends a call changing start message to the AS; the user B sends a session inviting message to the AS; the AS sends a session inviting message to the user C; the user C sends an acknowledgement response message to the AS; the AS sends an acknowledgement response message to the user B; a conversation between the user B and the user C is performed;

or, the AGCF user includes a user A, and the non-AGCF users include a user B and a user C; in the case of communication transfer in a ringing state, the performing the communication transfer service further comprises:

the user A hooks on, the AGCF releases the terminal of the user A; the AGCF sends a call changing request message to the AS; the AS sends a call changing request reception message to the AGCF; the AS sends a call changing start message to the AGCF; the AS sends a call releasing message to the AGCF for the call between the user A and the user C; the AS sends a call changing success message to the AGCF; the AGCF sends a call releasing message to the AS for the call between the user A and the user B;

after the user C hooks off to send an acknowledgement response message to the AS, the AS sends a call changing request message to the user B; the user B sends a call changing request reception message to the AS; the user B sends a call changing start message to the AS; the user B sends a session inviting message to the AS; the AS sends a session inviting message to the user C; the user C sends an acknowledgement response message to the AS; AS sends an acknowledgement response message to the user B; a conversation between the user B and the user C is performed.

10. A system for performing a communication transfer service for an access gateway control function user, comprising: a communication transfer performing unit configured for the AGCF user to access to a PES though the AGCF, wherein the communication transfer service for the AGCF user is performed by applying a tight/loose coupling mode between the AGCF and an application server (AS) and by applying an AS main control/end to end control mode between the AS and non-AGCF users.

11. The system according to claim 10, wherein the communication transfer unit, in the case that the tight coupling mode and the AS main control mode are applied, is further configured to such that after the AGCF user hooks on, the AGCF sends call releasing messages to the AS for the conversations between the AGCF user and the non-AGCF users, and triggers an interaction between the AGCF and the AS in the tight coupling mode; and the AS triggers the AS main control mode, by sending a media modifying request message to the non-AGCF users; the non-AGCF users perform a media negotiation in the AS main control mode and perform a conversation between each other.

12. The system according to claim 10, wherein the communication transfer unit, in the case that the tight coupling mode and the end to end control mode are applied, is further configured to such that after the AGCF user hooks on, the AGCF sends call releasing messages to the AS for the conversations between the AGCF user and the non-AGCF users, and triggers an interaction in the tight coupling mode between the AGCF and the AS; and the AS triggers the end to end control mode by sending call changing request messages to the non-AGCF users; the non-AGCF users perform media negotiations in the end to end control mode and perform a conversation between each other.

13. The system according to claim 10, wherein the communication transfer unit, in the case that the loose coupling mode and the AS main control mode are applied, is further configured to such that after the AGCF user hooks on, the AGCF triggers an interaction in the loose coupling mode between the AGCF and the AS by sending a call changing request message to the AS;

the AS triggers the AS main control mode by sending media modifying request messages to the non-AGCF users; the non-AGCF users perform a media negotiation in the AS main control mode and perform a conversation between each other.

14. The system according to claim 10, wherein the communication transfer unit, in the case that the loose coupling mode and the AS main control mode are applied, is further configured to such that after the AGCF user hooks on, the AGCF triggers an interaction in the loose coupling mode between the AGCF and the AS by sending a call changing request message to the AS; and the AS triggers the end to end control mode by sending call changing request messages to the non-AGCF users; the non-AGCF users perform a media negotiation in the end to end control mode and perform a conversation between each other.

* * * * *